(12) United States Patent
Verma

(10) Patent No.: US 10,616,083 B2
(45) Date of Patent: *Apr. 7, 2020

(54) DATA ACQUISITION USING REMOTE PLATFORM GATEWAYS

(71) Applicant: Siemens Aktiengesellschaft, München (DE)

(72) Inventor: Amit Verma, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,973

(22) Filed: Oct. 23, 2018

(65) Prior Publication Data

US 2019/0058644 A1    Feb. 21, 2019

Related U.S. Application Data

(63) Continuation of application No. 15/684,718, filed on Aug. 23, 2017, now Pat. No. 10,142,201.

(30) Foreign Application Priority Data

Sep. 6, 2016   (EP) .................................. 16187366

(51) Int. Cl.
   *H04L 12/26* (2006.01)
   *H04L 29/08* (2006.01)
   *H04L 12/66* (2006.01)

(52) U.S. Cl.
   CPC .............. *H04L 43/08* (2013.01); *H04L 12/66* (2013.01); *H04L 43/103* (2013.01); *H04L 67/28* (2013.01); *H04L 67/327* (2013.01); *H04L 67/12* (2013.01)

(58) Field of Classification Search
   CPC ...................................................... H04L 43/08
   See application file for complete search history.

(56) References Cited

U.S. PATENT DOCUMENTS

| 10,142,201 B2* | 11/2018 | Verma ..................... H04L 12/66 |
| 2007/0168397 A1 | 7/2007 | Satyanarayana |
| 2010/0315225 A1 | 12/2010 | Teague |
| 2011/0161599 A1 | 6/2011 | Craske |
| 2012/0304007 A1 | 11/2012 | Hanks et al. |
| 2015/0067176 A1 | 3/2015 | Dubois et al. |
| 2015/0281356 A1 | 10/2015 | Maturana et al. |
| 2015/0310362 A1 | 10/2015 | Huffman |

FOREIGN PATENT DOCUMENTS

EP    2958384 A1    12/2015

OTHER PUBLICATIONS

European Search Report for related European Application No. 16187366.6 dated Jan. 31, 2017.

* cited by examiner

*Primary Examiner* — Albert T Chou
(74) *Attorney, Agent, or Firm* — Lempia Summerfield Katz LLC

(57) ABSTRACT

A device network communicates with a remote platform such as a cloud service via a gateway. A network monitor device monitors network health and may adjust the amount of data collected by the gateway, reducing the amount of data collected in case of poor network health.

18 Claims, 4 Drawing Sheets

DATA ACQUISITION USING REMOTE PLATFORM GATEWAYS

This application is a continuation of U.S. patent application Ser. No. 15/684,718, filed Aug. 23, 2017, which is hereby incorporated by reference in its entirety. This application also claims the benefit of European Patent Application No. EP 16187366.6, filed Sep. 6, 2016, which is also hereby incorporated by reference in its entirety.

TECHNICAL FIELD

The present disclosure relates to data acquisition from a device network by remote platform gateways, and in particular to new data processing systems, device control systems, and methods for managing devices in an internet or things (IoT) system or in another networked environment.

BACKGROUND

The "Internet of Things" (IoT) is a name for a known trend in information technology, which refers to various technologies and methods for devices to exchange data via the internet and other computer networks. Devices that exchange data may be provided with embedded electronic circuitry, software, sensors, actuators, and communication devices providing network connectivity.

These concepts are useful in industry, including industrial automation systems, machines, sensors, and so on. The "Industrial Internet of Things" (IIoT) may refer to the exchange of data between devices in an industrial context. An IoT architecture may be "industrial" by virtue of the types of connected devices, by the choice of communications protocols used to exchange data, the choice of network architecture employed, and physical characteristics of the devices and network components such as being able to cope with wide variations in temperature, or being robust to cope with vibrations or other harsh environmental conditions.

A plurality of devices such as including industrial automation systems, machines, sensors, automation systems, and so on may be connected to a remote service via a gateway device (which for convenience may simply be referred to as a "gateway").

The remote service includes a platform arranged to receive data from the devices. It may also include modules that analyze the data, display the data, generate and send control signals for the devices, and send the control signals for adjusting the operation of the devices.

The remote service may be a cloud service but may also have a non-cloud implementation. In this disclosure, a "remote service" or a "remote platform" may include or be provided as a "cloud service" or "cloud platform," respectively.

The gateway may be co-located or integrated with other network components such as a switch or router. Where the remote platform is a cloud platform, the gateway device includes a cloud gateway.

The gateway collects data from the devices and optionally may pre-process, analyze, or encrypt the data. The gateway forwards the data further to the remote platform. The gateway acts as an interface between the remote platform and the devices. It may also facilitate a closed loop control between the remote platform and the devices.

A gateway may be configured to collect a number of time series variables, files, alarms, and events data from the devices and the automation systems to which it is connected. This collection of data leads to additional network traffic and hence additional load on the device network.

The additional network load may cause congestion of the device network, lead to network packet delay and/or losses, and slow the device network down. In industrial applications, slowing down of the industrial automation network may result in loss of real time communication that may negatively impact productivity and safety.

There is a need for methods and systems that solve or ameliorate these or other problems.

SUMMARY AND DESCRIPTION

The scope of the present disclosure is defined solely by the appended claims and is not affected to any degree by the statements within this description. The present embodiments may obviate one or more of the drawbacks or limitations in the related art.

According to a first aspect of the present disclosure, a data processing system is provided. The data processing system includes a gateway arranged to exchange data between devices in a device network and a remote platform, and a network monitoring device arranged to collect network parameters from the device network and report to the gateway. The gateway is arranged to adjust its operation based on the collected network parameters.

This provides a new method for managing devices where data that needs to be collected from the devices is prioritized, and then the amount of data that is collected by a gateway or other monitoring devices is optimized so that the device network is not negatively impacted. This effectively throttles the speed of the gateway so that the device network does not become overloaded and so reduces the operational risk of including a gateway such as a cloud gateway in a production environment.

A "network parameter" may refer to any measurable variable that characterizes a status of the network or a performance of the network, such as one that has some bearing on the health of the network, either directly or indirectly.

A "platform" may refer to any computing environment, providing the capability for running software applications. A platform is remote from the device network if the platform is logically distinct from or physically separated from the device network.

The gateway includes a data prioritization module that stores data items which may be collected from the device network and associates a priority level with each data item.

Different priority levels may be allocated to different items on the list. The list of data items with the associated priority levels therefore provides a new data structure that enables the prioritization of data to be collected.

The data prioritization module stores a first list of data items to be collected and a second list of data items not to be collected.

Optionally, the first list includes a first-in-first-out (FIFO) data structure and the second list includes a first-in-last-out (FILO) data structure.

This FIFO/FILO arrangement is a suitable embodiment that enables selective population or depopulation of the lists for dynamic variation of the data that is collected by the data processing system; as explained in more detail below.

Optionally, the gateway includes a data acquisition module that collects data items from the device network included in the first list; and does not collect data items from the device network included in the second list.

Optionally, the network parameters include one or more of: receive errors on network interfaces, transmit errors on network interfaces, collision rate on network interfaces, packet delay in the network, packet loss in the network, packet round-trip time, or network latency.

Optionally, the gateway is arranged to restrict the amount of data it collects from a device network if one or more key performance indicators derived from the network parameters indicate poor network health.

Optionally, a key performance indicator includes the value of a network parameter, a value derived from a network parameter, or a value based on the combination of two or more network parameters.

Optionally, the gateway is arranged to selectively collect data items based on the priority levels associated with the data items.

The data prioritization module is arranged to implement a routine including the acts of: assessing the network parameters to determine the health of the network; and if it is determined that the network is in poor health, re-move a data item removed from the first list of data items to be collected and add the data item to the second list of data items not to be collected; else; if it is determined that the network is in good health, remove a data item removed from the second list of data items not to be collected and add the data item to the first list of data items to be collected; and then to repeat the routine.

This routine of selective population or depopulation of the lists results in a dynamic variation of the data that is collected by the data processing system.

This disclosure also presents a device control system comprising: a device network; a gateway arranged to exchange data between devices in the device network and a remote platform; and a network monitoring device arranged to collect network parameters from the device network and report to the gateway, wherein the gateway is arranged to adjust its operation based on the collected network parameters.

According to a second aspect of the present disclosure, a method of managing devices in a device network is provided. The method includes: exchanging data between the devices and a remote platform via a gateway; monitoring network parameters of the device network; and adjusting operation of the gateway based on the monitored network parameters.

The method includes storing data items that may be collected from the device network and associating a priority level with each data item.

The method further includes, via a data prioritization module, storing a first list of data items to be collected and storing a second list of data items not to be collected; and collecting, via a data acquisition module data items from the device network included in the first list; and not collecting data items from the device network included in the second list.

The gateway restricts the amount of data it collects from a device network if one or more key performance indicators derived from the network parameters indicate poor network health.

This disclosure provides methods and apparatus whereby the amount of data collected from a device network by a gateway may be adjusted based on measuring network parameters of the device network. The network parameters may, either by themselves or in combination, provide one or more key performance indicators (KPIs) that may be representative of a health of the device network, that is, a quantification of network performance or indication of network problems. The device network may be an automation network or some other network of devices.

Gateway functionality reflecting traffic status is known per se and exemplary embodiments are disclosed in U.S. Patent Publication No. 2012/0304007 A1 and U.S. Patent Publication No. 2015/0067176 A1. U.S. Patent Publication No. 2012/0304007 A1 proposes a gateway provided for executing corrective actions in order to maintain an expected behavior. U.S. Patent Publication No. 2015/0067176 A1 proposes a gateway attempting to enhance received data.

A device network considered by the present application includes a plurality of devices connected to a network infrastructure for the exchange of data. A switching device may be provided as part of the device network to control the exchange of data and which may have other components such as control logic or a display component arranged to send data to a user display.

Data may be exchanged between the devices, or between devices and a switching device, or both between devices and between devices and a switching device. The network infrastructure may provide wired or wireless communication links between the devices (and the switching device if this is provided), or a combination of wired and wireless communication links, where a wireless communication link provides for electromagnetic or acoustic waves to carry a signal through atmospheric space rather than along a wire. Devices in a device network do not all need to be capable of exchanging data with all other devices, although that is also possible.

The devices forming part of the device network may include machines coupled indirectly to the network via controller devices. The controller devices may be connected to a data bus forming part of the network infrastructure in order to exchange data with other machines or controller devices or a network switching device. An example of a device network is an automation network in which case various industrial machines are connected to a network. The machines may be connected via a suitable interface to a controller device such as a programmable logic controller (PLC), which may in turn be connected to a data bus for connection with other controller devices, switching devices, or directly to other machines.

Further aspects, features, and advantages of the present disclosure will become apparent from the drawings and detailed description of the following embodiments.

BRIEF DESCRIPTION OF THE DRAWINGS

The above-mentioned and other concepts of the present disclosure will now be addressed with reference to the drawings of the embodiments. The shown embodiments are intended to illustrate, but not to limit the disclosure. The drawings contain the following figures, in which like numbers refer to like parts throughout the description and drawings and wherein.

DETAILED DESCRIPTION

Figure 1:
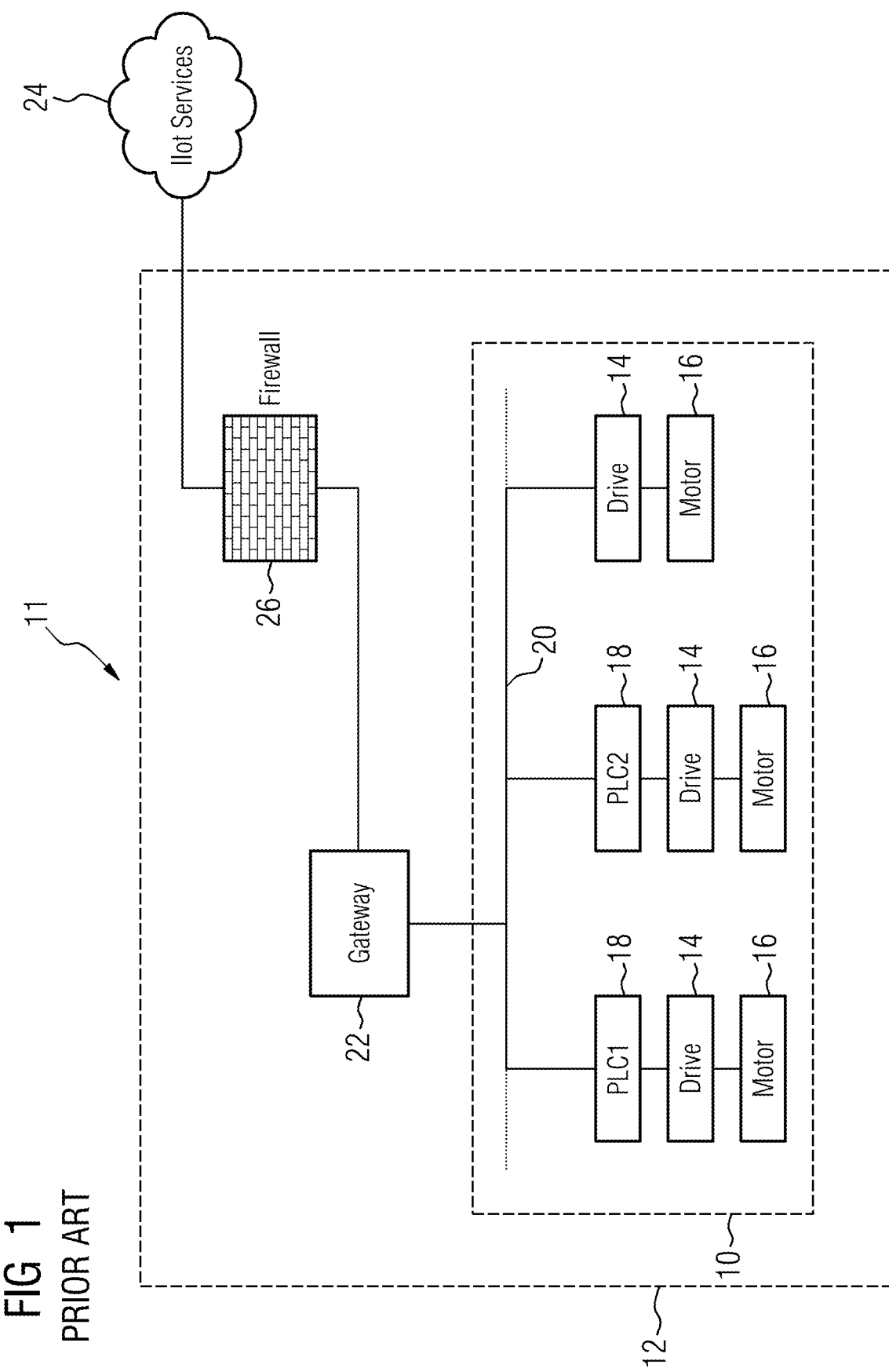
FIG. 1 depicts a prior art device control system, being an industrial automation network.

FIG. 1 depicts a device network 10 controlled by a device control system 11. In this example, the device network 10 includes an automation network provided at a manufacturing plant 12. The device network 10 includes machines having industrial equipment such as drives 14 and motors 16. These are shown for illustration purposes only and it is to be appreciated that there are many other types of machine that may be connected, and that the machines may include sensors and other networking components. The machines 14, 16 may be coupled with respective controller devices 18 that may be programmable logic controllers (PLCs) 18. Network infrastructure includes a communications bus 20 which may be coupled with the machines 14, 16 directly, or with controller devices 18. The devices may be connected via field protocols such as PROFINET, PROFIBUS, Industrial Ethernet, EtherCAT, and so on.

The device network 10 is connected to a gateway 22, which acts to exchange data between the device network 10 and a remote platform 24, e.g., via a firewall 26. The gateway 22 may include a switching device and various other components to receive data from the device network 10 and send it on to the remote platform 24 for processing, reporting and analysis. The remote platform 24 provides IIoT services for carrying out these functions and may provide a cloud service for carrying out these functions. The remote platform 24 may then send instructions back to the gateway 22 for adjusting the operation of the device network 10. The gateway 22 relays the instructions via the network infrastructure to the connected devices to adjust their operational parameters.

Figure 2:
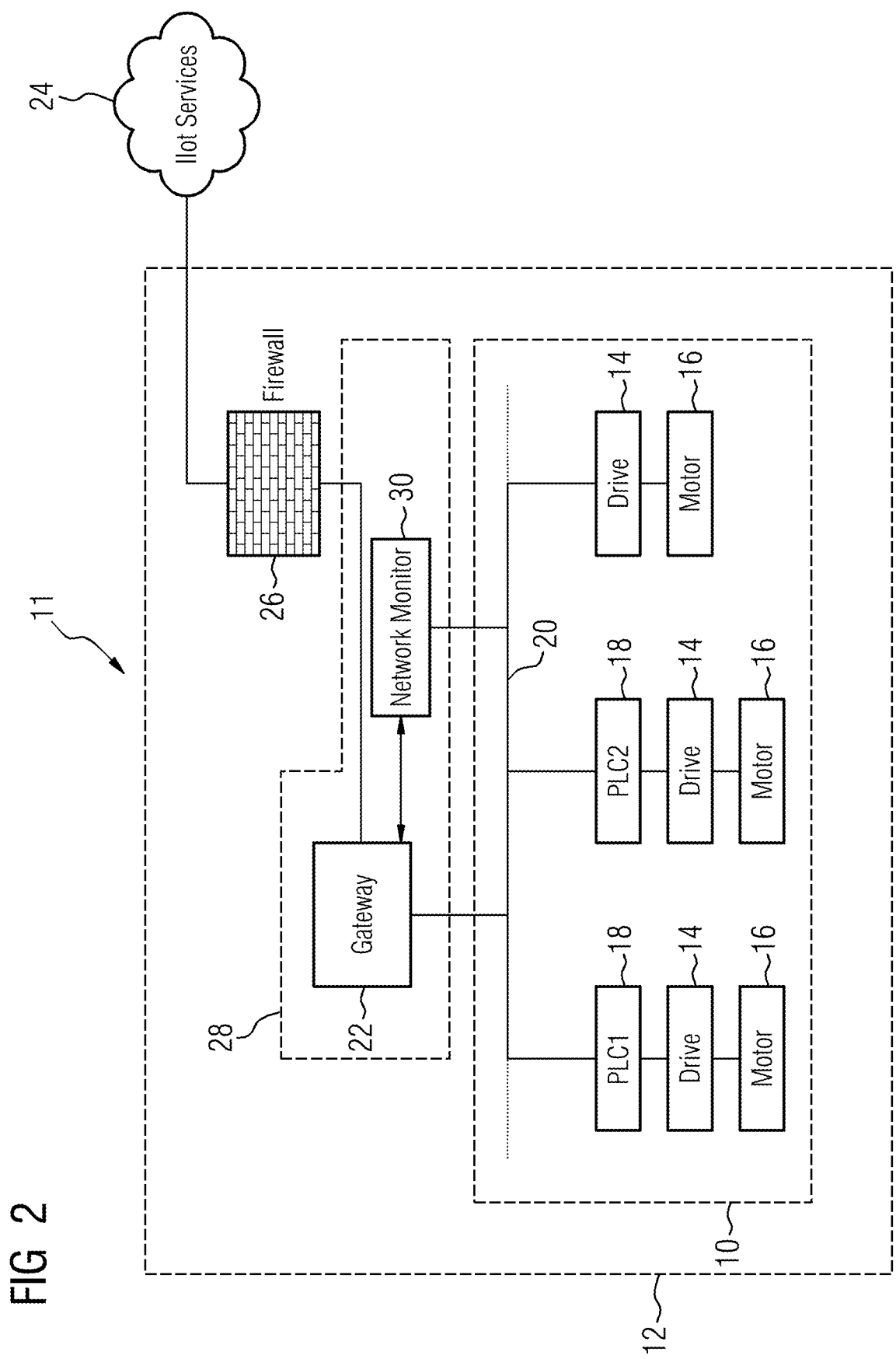
FIG. 2 depicts a device control system according to an exemplary embodiment.

FIG. 2 depicts a device network 10 controlled by a device control system 11 according to an embodiment of the present disclosure. In FIG. 2, like reference numerals are used to refer to like components as compared with the device control system 11 of FIG. 1. Here, a data processing system 28 includes a gateway 22 and a new network monitoring device 30, which may be referred to as a network monitor 30.

The network monitor 30 may be implemented as suitable software installed on a hardware device to monitor network health and key performance indicators (KPIs). The network monitor 30 may passively sniff network traffic to determine the network health, or the network monitor 30 may actively send data packets (e.g., suitably using the internet control messaging protocol (ICMP) but also using any other suitable protocol) to perform other network health monitoring tests. The network monitor 30 may also be installed as a software or a service on the gateway 22 itself or an industrial router (not shown).

The gateway 22 is connected to the network monitor 30 to receive the network health KPIs. The network health KPIs may include network parameters or combinations of network parameters. Examples include receive errors on network interfaces, transmit errors on network interfaces, collision rate on network interfaces, packet delay in the network, packet loss in the network, packet round trip time, or network latency. It will be appreciated that other parameters may be measured, and that KPIs may be defined based on different measures related to these parameters either alone or in combination.

As one non-limiting example, let us calculate a summary KPI that is derived from other KPIs (as above) and is representative of the health of the device network 10. KPI_Summary may be calculated as being: 0.1×(1−% of Receive errors)+0.1×(1−% of Transmit errors+0.1×(1−% of Collision rate)+ . . . .

KPI_Summary is a positive KPI here, e.g., the higher the value of this KPI, the better the health of the network 10. Let us further assume that the network health is considered good if KPI_Summary is greater than a predetermined threshold value, KPI_Threshold. If KPI_Summary is less than KPI_Threshold, it may be determined that the gateway 22 is loading the network 10 and it has to reduce the amount of data collected from the network 10. The KPI_Summary may be also formulated or chosen in a way so that it directly correlates the activities of the gateway 22 with that of network health.

The gateway 22 according to the present disclosure contains a list of data items to be collected, and also associates a priority level with each data item. A data item to be collected includes one data output that is provided by a device. One device may provide multiple data items. The priorities may be defined by a numerical or other index, with the index defining a relative importance for the purpose of data collection and monitoring. The priorities may be provided during a one-time configuration process when the network is set up; and they may also be adjusted as needed to reflect changing business objectives or changes to the device network 10.

For example, there may be four priority levels defined with "priority 1" defining the highest priority, through to "priority 4" defining the lowest priority. Alarms and events may be assigned priority 1; temperature time series data may be assigned priority 2; pressure time series data may be assigned priority 2; vibration time series data may be assigned priority 3; and log files may be assigned priority 4.

Figure 3:
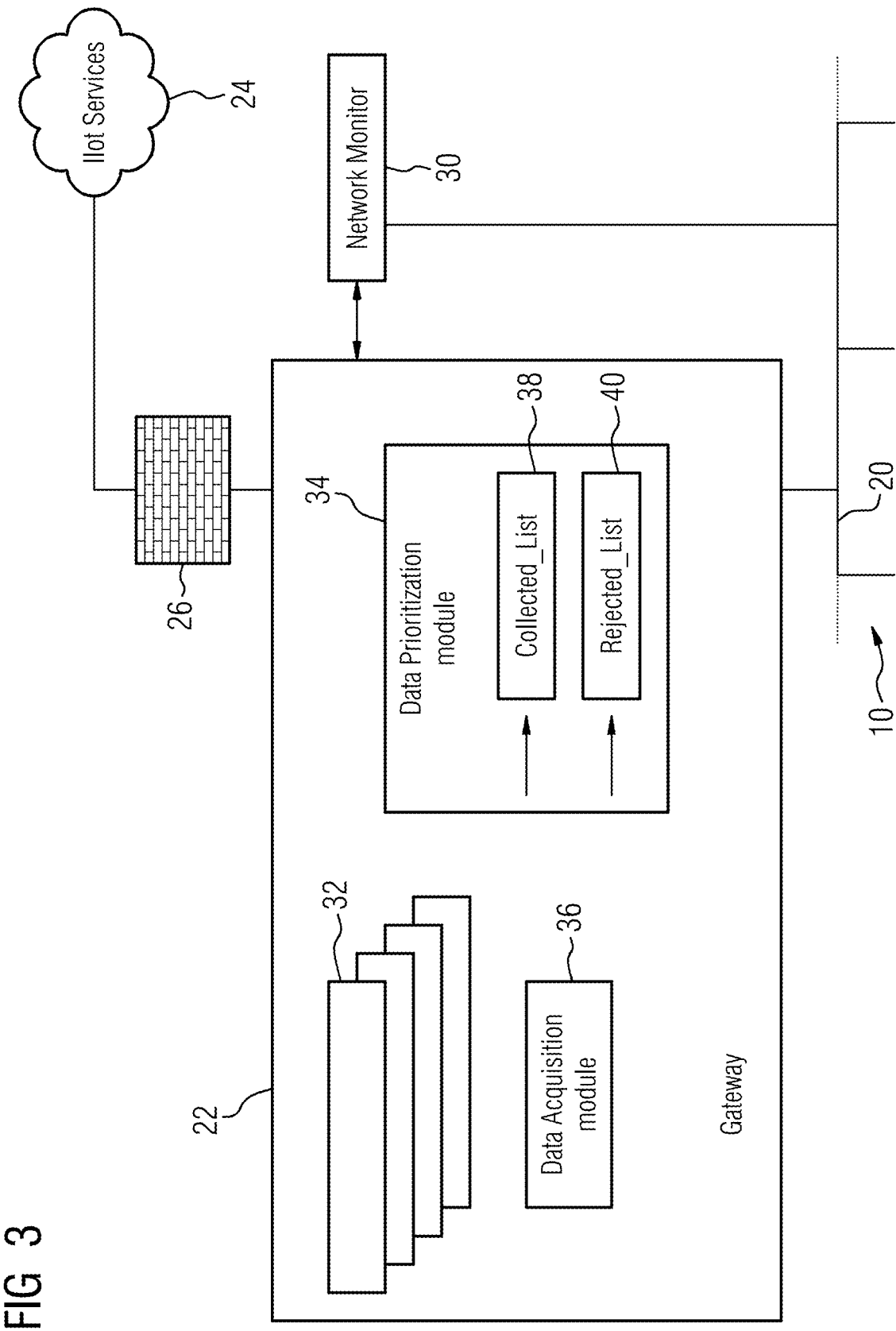
FIG. 3 depicts aspects of a gateway according to an embodiment of the disclosure, which may be used as part of the device control system of FIG. 2.

FIG. 3 depicts a schematic of a gateway 22 according to an embodiment of the disclosure and which may be provided as part of the device control system 11 of FIG. 2. The gateway 22 is connected to the network monitor 30, the device network 10, and the remote platform 24. Internally, the gateway 22 may contain various modules 32 that may relate to network communication, data handling, etc., as is known in the art. The gateway 22 also includes a data prioritization module 34 that prioritizes the data to be collected from the device network 10 based on the feedback about network health as received from the network monitor 30. A data acquisition module 36 collects the data from the automation network as specified by the data prioritization module 34.

The data prioritization module 34 may contain two lists of data items, a first list 38 including a list of data items to be collected by the gateway 22 (referred to as "Collected_List" 38) and a second list 40 including a list of data items not to be collected by the gateway 22 (referred to as "Rejected_List" 40).

In an embodiment, the list 38 of data items to be collected is implemented as a first in, first out (FIFO) queue where a data item is added to the list 38 with an enqueue operation and removed with a dequeue operation, and list 40 of data items not to be collected is implemented as a first in, last out (FILO) stack where a data item is added to the list 40 with a push operation and removed with a pop operation.

In this case, an operation Collected_List.queue( ) adds a data item as the end of the queue, e.g., the list 38 of data items to be collected, and an operation Collected_List.dequeue( ) removes a data item from the end of the queue. As an example, the Collected_List 38 may contain alarms & events, temperature time series data and pressure time series data; that is, taken from the example priority list above, all data items that have associated priority levels "1" or "2"; e.g., the list contains data items that are associated with relatively high priority levels.

Similarly, an operation Rejected_List.push( ) adds a specified data item at the top of the stack, e.g., the list 40 of data items not to be collected, and an operation Rejected_List.pop( ) removes a data item from the top of the stack. As an example, the Rejected_List 40 may contain vibration time series data and log files, that is, taken from the example priority list above, all data items that have associated priority levels "3" or "4", (e.g., the list contains data items that are associated with relatively low priority levels).

The data prioritization module 34 adjusts which data items are in each list based on the feedback from the network monitor 30. It is noted that the priorities of all items in the Collected_List 38 are greater than that of the items in the Rejected_List 40. The lists 38, 40 may store the data items in order of their priority, so that lower priority data items get removed from the Collected_List 38 and get added to the Rejected_List 40 before higher priority data items.

It is to be appreciated that the lists 38, 40 may be implemented using other linear or non-linear data structures apart from those mentioned above.

Figure 4:
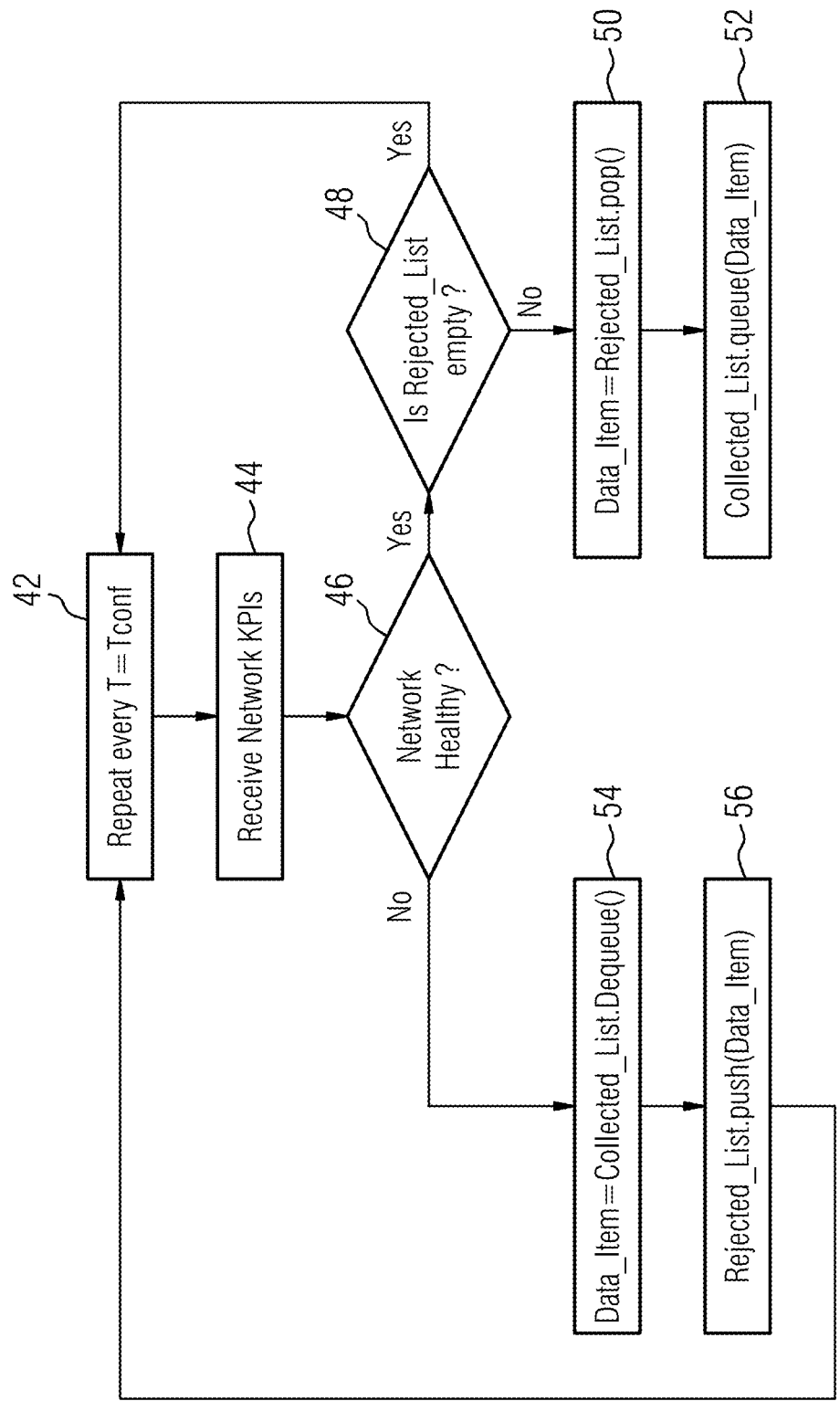
FIG. 4 illustrates aspects of the operation of an exemplary data prioritization module that may be provided as part of a gateway.

FIG. 4 illustrates an algorithm executed by the data prioritization module 34 for the prioritization of data. Tconf is the time interval after which network health KPIs are received by the data prioritization module 34. In summary, the algorithm tries to empty the Collected_List 38 when the network health is bad, by transferring items from the Collected_List 38 to the Rejected_List 40. When the network health is good, it tries to empty the Rejected_List 40, so that all the data items are collected.

The process is initiated 42 at each time period Tconf, at which point the data prioritization module 34 receives 44 the network health KPIs. It is then checked 46 whether the network is healthy. This is done by comparing the KPI to a threshold—the network being indicated as healthy for a positive KPI if a given threshold is exceeded or for a negative KPI by a threshold not being exceeded. If the network health is good, then a check 48 is made to see if the Rejected_List 40 is empty. If not, then a first data item is removed 50 from the Rejected_List 40 (here, a pop operation is performed), and added 52 to the Collected_List 40 (here, a queue operation is performed). If the Rejected_List 40 is empty, then the process ends and is repeated again at the next time interval as governed by Tconf.

If the network health is poor, then a first data item is removed from the Collected_List 38 (here, a dequeue operation is performed), and added to the Rejected_List 40 (here, a push operation is performed). The process then ends and is repeated again at the next time interval as governed by Tconf.

In this way, during a time period when the network health is poor, at each time interval Tconf, an item will be removed from the Collected_List 38 and added to the Rejected_List 40. This will continue until the network health improves and reverts to a healthy status. If this does not happen, the Collected_List 38 will eventually be emptied entirely so that the gateway 22 does not collect any data and so does not create an additional load on the network 10. This cessation of data collection may be achieved without prejudicing disaster recovery or other critical command and control functionalities.

Similarly, during a time period when the network health is good, at each time interval Tconf, an item will be removed from the Rejected_List 40 and added to the Collected_List 38 until the Rejected_List 40 is empty, in other words, the full set of data items is collected by the gateway 22.

Those skilled in the art will readily understand the disclosure may be applied to plants, plant sections (e.g., test fields), plant components (e.g., assembly lines or production lines), or plant units (e.g., pumps, squeezer, compressors or machines). Furthermore, those skilled in the art will readily understand the disclosure may be used in production industries, manufacturing industries, continuous industries, process industries, and batch processing industries.

In addition to the embodiments described above, those of skill in the art will be able to arrive at a variety of other arrangements and acts which, if not explicitly described in this document, nevertheless embody the principles of the disclosure and fall within the scope of the appended claims.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A data processing system comprising:
a gateway configured to exchange data between devices in a device network and a remote platform; and
a network monitoring device configured to collect network parameters from the device network and report to the gateway,
wherein the gateway is configured to adjust its operation based on the collected network parameters,
wherein the gateway comprises a data prioritization module configured to store data items to be collected from the device network and associate a priority level with each data item,
wherein the data prioritization module stores a first list of data items to be collected and a second list of data items not to be collected, and
wherein the data prioritization module is configured to:
determine a health of the device network via an assessment of the network parameters;
remove a data item from the first list of data items to be collected and add the data item to the second list of data items not to be collected when poor health of the device network is determined; and
remove a data item from the second list of data items not to be collected and add the data item to the first list of data items to be collected when good health of the device network is determined.

2. The data processing system of claim 1, wherein the first list comprises a first-in-first-out data structure and the second list comprises a first-in-last-out data structure.

3. The data processing system of claim 1, wherein the network parameters comprise receive errors on network interfaces, transmit errors on the network interfaces, collision rate on the network interfaces, a packet delay in the device network, a packet loss in the device network, a packet round-trip time, network latency, or a combination thereof.

4. The data processing system of claim 1, wherein the gateway comprises a data acquisition module configured to collect data items from the device network included in the first list, and does not collect data items from the device network included in the second list.

5. The data processing system of claim 4, wherein the data acquisition module is configured to restrict an amount of data collected from the device network when one or more key performance indicators derived from the network parameters indicate the poor health of the device network.

6. The data processing system of claim 5, wherein the one or more key performance indicators comprise a value of a network parameter, a value derived from a network parameter, or a value based on a combination of two or more network parameters.

7. The data processing system of claim 4, wherein the data acquisition module is configured to selectively collect data items based on the priority levels associated with the data items.

8. A method of managing devices in a device network, the method comprising:
storing data items configured to be collected from the device network and associating a priority level with each data item;
storing a first list of data items to be collected and a second list of data items not to be collected;
receiving network parameters of the device network from a networking monitoring device;
determining a health of the device network via an assessment of the received network parameters;
removing a data item from the first list of data items to be collected and adding the data item to the second list of data items not to be collected when poor health of the device network is determined; and
removing a data item from the second list of data items not to be collected and adding the data item to the first list of data items to be collected when good health of the device network is determined.

9. The method of claim 8, further comprising:
collecting data items from the device network included in the first list, and not collecting data items from the device network included in the second list.

10. The method of claim 9, wherein collecting the data items from the device network comprises selectively collecting data items based on the priority levels associated with the data items.

11. The method of claim 8, wherein the network parameters comprise receive errors on network interfaces, transmit errors on the network interfaces, collision rate on the network interfaces, a packet delay in the device network, a packet loss in the device network, a packet round-trip time, network latency, or a combination thereof.

12. A gateway configured to exchange data between devices in a device network and a remote platform, the gateway comprising:
a data prioritization module configured to:
store data items to be collected from the device network and associate a priority level with each data item, wherein the stored data items comprise a first list of data items to be collected and a second list of data items not to be collected;
determine a health of the device network via an assessment of network parameters received from a network monitoring device; and
remove a data item from the first list of data items to be collected and add the data item to the second list of data items not to be collected when poor health of the device network is determined.

13. The gateway of claim 12, wherein the data prioritization module is configured to remove a data item from the second list of data items not to be collected and add the data item to the first list of data items to be collected when good health of the device network is determined.

14. The gateway of claim 12, wherein the network parameters comprise receive errors on network interfaces, transmit errors on the network interfaces, collision rate on the network interfaces, a packet delay in the device network, a packet loss in the device network, a packet round-trip time, network latency, or a combination thereof.

15. The gateway of claim 12, further comprising:
a data acquisition module configured to collect data items from the device network included in the first list, and not collect data items from the device network included in the second list.

16. The gateway of claim 15, wherein the data acquisition module is configured to restrict an amount of data collected from the device network when one or more key performance indicators derived from the network parameters indicate the poor health of the device network.

17. The gateway of claim 16, wherein the one or more key performance indicators comprise a value of a network parameter, a value derived from a network parameter, or a value based on a combination of two or more network parameters.

18. The gateway of claim 15, wherein the data acquisition module is configured to selectively collect data items based on the priority levels associated with the data items.

* * * * *